Patented Nov. 8, 1949

2,487,270

UNITED STATES PATENT OFFICE 2,487,270

PRODUCING BERYLLIUM FLUORIDE

Warren S. Peterson, New Kensington, Pa., and Charles B. Willmore, Batavia, Ill., assignors to Aluminum Company of America, Pittsburgh, Pa., a corporation of Pennsylvania No Drawing. Application November 5, 1947, Serial No. 784,312

14 Claims. (Cl. 28—88)

This invention relates to the production of beryllium fluoride, which compound is useable as a source of metallic beryllium and for other purposes as well. The invention particularly relates to improvements in a process of converting the beryllium content of siliceous beryllium ores to beryllium fluoride, and is not particularly concerned with after treatments sometimes employed for separating beryllium fluoride from other materials or for reducing beryllium fluoride to metallic beryllium.

The principal object of this invention is the provision of improvements in a process by which beryllium may be extracted in the form of beryllium fluoride from siliceous beryllium ores such as beryl, phenacite, and the like. Steps of the new process will be described hereinafter in connection with the treatment of beryl or similar beryllium ores, which contain aluminous matter in addition to siliceous matter; but they are also applicable to the treatment of phenacite or similar beryllium ores which do not contain aluminous matter. Beryl is the commercially employed source of metallic beryllium and its compounds. It is a beryllium-aluminum silicate, generally described by the formula $3BeO.Al_2O_3.6SiO_2$; and it can be considered for practical purposes, as being composed of beryllia, alumina, and silica. Theoretically, it contains about 5 per cent by weight of beryllium, although it often contains as little as 3.5 per cent.

Beryl or similar beryllium ore is usually treated to eliminate all or a greater part of the silica therefrom, prior to the conversion of the beryllia to beryllium fluoride. Conventional methods for carrying out such preliminary treatment may be used economically to remove a large part of the silica from the ore. Attempts to remove all of the silica by prior art methods are usually very wasteful. It is, then, another object of this invention to provide steps by which beryllium ores containing small amounts of silica may be treated to reduce still further the amount of silica contained therein or to eliminate it entirely.

Silica can be largely eliminated from beryl and similar ores by smelting with carbon and iron. This process involves grinding the ore to a finely divided form and mixing it with carbon; iron is also added to the mixture and the whole is smelted at a temperature of about 1,900° C. or higher; and the silica is largely reduced to metallic silicon which then alloys with the iron to form ferrosilicon. The latter may be tapped off, and the remaining slag will be composed principally of beryllia and alumina. If an attempt is made to remove all of the silica by the process just described, higher smelting temperatures are usually necessary, and there is a large loss of beryllia. The losses approach 40 per cent of the original amount of beryllia in the ore. On the other hand, if the process just described is so employed as to reduce the amount of silica in the ore to no less than about 10 to 15 per cent of the original amount, then there is substantially no loss of beryllia. It is obvious that a method of treating the product of the latter procedure, so as to still further reduce the amount of silica therein without loss of beryllium values, would be very desirable, since the retained beryllium values are very valuable.

We have discovered a method of removing substantially all of the silica from beryl and similar ores, one that is particularly suitable for use in combination with the method just discussed when that method is employed to reduce the amount of silica in the ore to about 10 to 15 per cent of the original amount. In particular the method we have discovered is especially adapted to be employed in connection with beryllium ores having a low or reduced silica content; but it may be employed with any siliceous beryllium ore, if desired.

According to our method, the ore (or the slag produced from a previous process, which product is considered encompassed by the word "ore") is treated with hydrogen fluoride, preferably anhydrous hydrogen fluoride, a gas, under conditions which are controlled so as to convert the beryllium content thereof to beryllium fluoride, with no substantial loss of beryllium values in the ore. Prior to the hydrogen fluoride treatment, the ore should ordinarily be comminuted; preferably it is at least broken up into granular particles. Especially suitable granular particles can be made if the ore is first pulverized so that it passes a 100 mesh screen, then bonded together, and finally broken up into granules. This procedure produces granules of porous character adapted to be readily permeated by hydrogen fluoride. Bonding of the pulverized particles may be effected with an organic binder such as tar or sugar, or with a dilute solution of caustic soda. Following bonding, the material is usually heated and dried before being finally broken up into granules. While it has been indicated that the method may be carried out with granules of ore, especially granules formed from pulverized material and a binder, it may be also carried out simply with finely pulverized ore, provided that the pulverized ore is stirred continuously while being treated with hydrogen fluoride.

The ore, in one of the comminuted forms indicated, is first treated with hydrogen fluoride at a temperature of at least about 450° C. and not more than about 500° C. Below 450° C., hydrogen fluoride reacts very slowly with the ore. Above 450° C. hydrogen fluoride reacts readily with the silica in the ore. When the ore is so treated with hydrogen fluoride, silica therein may be substantially completely converted to silicon fluoride (which passes off as a gas), while at the same time there is little reaction between hydrogen fluoride and the beryllia (or the alumina, if present). One of the reasons why it is undesirable to permit the above-mentioned treatment temperature to rise above about 500° C. is that, at higher temperatures, the granules (or other form of ore) become glazed or coated and thus less permeable to hydrogen fluoride. Also higher temperatures favor reaction between hydrogen fluoride and beryllia (and alumina, if present), with the formation of large amounts of water and a retarding effect on the reaction of hydrogen fluoride with the ore especially the silica therein.

Proceeding further with our new method, after removal of substantially all of the silica by the treatment with hydrogen fluoride at a temperature within the range just referred to, the previously treated ore is then treated with hydrogen fluoride at a temperature of at least about 600° C. and not more than about 700° C. At such temperatures the reaction between hydrogen fluoride and beryllia (and alumina, if present) proceeds very rapidly, and may be carried substantially to completion if silica has first been removed from the ore, as previously described. The silica removal in the first step appears to leave the structure of the granules (or other form of ore being treated) in a more reactive condition for the second step. As is suggested by previous remarks, if silica is permitted to be present when the ore is treated at the higher treating temperatures of the second step, glazing or cementing of the ore particles and consequent reduction of their permeability would make removal of the silica difficult.

Our invention embraces a number of improvements in producing beryllium fluoride from siliceous beryllium ore, important steps thereof comprising first treating the ore with hydrogen fluoride at a temperature between about 450 and 500° C. (preferably about 500° C.) for a sufficient period to remove a substantial portion of the silicon content therefrom, and thereafter treating the remaining material with hydrogen fluoride at a temperature between about 600 and 700° C. (preferably about 650° C.) for a sufficient period to convert at least a substantial portion of the beryllium content thereof to beryllium fluoride. The invention is particularly an improvement in a process wherein the siliceous beryllium ore is preliminarily treated with carbon and iron, as indicated. We have also found that it is very desirable to have some carbon present with the ore in a form capable of reducing water at the temperatures employed, e. g. uncombined carbon, carbon monoxide, or a hydrocarbon gas such as methane, at least during one hydrogen fluoride treatment step, preferably when beryllia is converted to beryllium fluoride, the second step described above. The carbon thus introduced into the reaction reduces the water formed by the reaction of hydrogen fluoride with the various oxides in the mixture, and counteracts the retarding effect of water on the reactions taking place.

The product of the process consists principally of beryllium fluoride (and aluminum fluoride, if alumina was present in the ore). Slight amounts of silica may be carried over, but the process is highly efficient. If beryllium fluoride and aluminum fluoride are mixed in the product they may be reduced directly to produce an aluminum-beryllium alloy, or the mixed salts may be separated by any of several well-known procedures.

Our process may be carried out by batch methods, or in a continuous cycle, such as the following. Ore may be charged at the top of a conversion chamber and the converted product discharged at the bottom. Hydrogen fluoride may be passed in at the bottom so that it will rise upwardly through the down-coming charge. The principal reaction wherein the beryllia is converted to beryllium fluoride, with evolution of heat, occurs near the bottom of the chamber. The hot gases from this zone rise, being cooled as they heat the incoming charge. Thus, in an upper zone of the chamber, there is a lower temperature range suitable for the preliminary reaction wherein the silica is converted to silicon fluoride.

The continuous cycle may not result in complete removal of the silica if the hydrogen fluoride reaching the upper zone is accompanied by the comparatively large amount of water normally produced by the reactions in the lower zone. However, the efficiency of the continuous cycle will be greatly increased if the principal portion of this water so produced has been converted to carbon dioxide or carbon monoxide, and hydrogen, by suitable reactions. This indicates that the presence of carbon or a hydrocarbon gas has special advantages in the continuous cycle. Furthermore, since it may be found desirable to preheat the incoming hydrogen fluoride gas for a continuous cycle (in order to favor the principal reaction in the lower zone), the reaction of carbon or a hydrocarbon gas with water is desirable. This results in the absorption of some of the heat of the cycle, which is not needed in the upper zone.

We are aware that hydrogen fluoride has been used before for decomposing beryl. We are also aware that it has been recommended that such a hydrogen fluoride treatment be carried out at about 500 to 600° C. However, we are not aware that the treatment which we have discovered, and described and claimed herein, has ever been suggested before.

We claim as our invention:

1. In a process of producing beryllium fluoride from siliceous beryllium ore, the steps comprising first treating the ore with hydrogen fluoride at a temperature of not more than about 500° C. for a sufficient period to substantially eliminate the silicon content therefrom, and thereafter treating the remaining material with hydrogen fluoride at a temperature of at least about 600° C. for a sufficient period to convert at least a substantial portion of the beryllium content thereof to beryllium fluoride.

2. In a process of producing beryllium fluoride from siliceous beryllium ore, the steps comprising first treating the ore with hydrogen fluoride at a temperature between about 450 and 500° C. for a sufficient period to substantially eliminate the silicon content therefrom, and thereafter treating the remaining material with hydrogen fluoride at a temperature between about 600 and 700° C. for a sufficient period to convert at least a substantial portion of the beryllium content thereof to beryllium fluoride.

3. In a process of producing beryllium fluoride from siliceous beryllium ore, the steps comprising first treating the ore with hydrogen fluoride at a temperature of about 500° C. for a sufficient period to substantially eliminate the silicon content therefrom by conversion of the same to silicon fluoride, and thereafter treating the remaining material with hydrogen fluoride at a temperature of about 650° C. to convert substantially the entire beryllium content thereof to beryllium fluoride.

4. In the process of claim 1, the additional improvement of treating the ore, in at least one of the hydrogen fluoride treating steps, in the presence of carbon in a form capable of reducing water at the temperature employed.

5. In the process of claim 1, the additional improvement of treating the ore, in at least one of the hydrogen fluoride treating steps, in the presence of carbon.

6. In the process of claim 1, the additional improvement of treating the ore in at least one of the hydrogen fluoride treating steps, in the presence of a hydrocarbon gas.

7. In a process of producing beryllium fluoride from siliceous beryllium ore, the steps comprising mixing the ore with carbon and iron, smelting the mixture to form a slag of low silicon content and ferro-silicon, tapping off the ferro-silicon, comminuting the slag, and then treating the slag with hydrogen fluoride at a temperature of not more than about 500° C. for a sufficient period to substantially eliminate the silicon content therefrom, and thereafter treating the remaining material with hydrogen fluoride at a temperature of at least about 600° C. for a sufficient period to convert at least a substantial portion of the beryllium content thereof to beryllium fluoride.

8. In a process of producing beryllium fluoride from siliceous beryllium ore, the steps comprising mixing the ore with carbon and iron, smelting the mixture to form a slag containing about 10 to 15 per cent of the original amount of silica in the ore and ferro-silicon, tapping off the ferro-silicon, cooling the slag, comminuting the slag, and then treating the slag with hydrogen fluoride at a temperature between about 450 and 500° C. for a sufficient period to substantially eliminate the silicon content therefrom, and thereafter treating the remaining material with hydrogen fluoride at a temperature between about 600 and 700° C. for a sufficient period to convert at least a substantial portion of the beryllium content thereof to beryllium fluoride.

9. In the process of claim 7, the additional improvement of so comminuting the slag that it passes a 100 mesh screen, bonding the particles of slag with a binder, and finally breaking up the bonded slag into granules for treatment with hydrogen fluoride.

10. In the process of claim 7, the additional improvement of so comminuting the slag that it passes a 100 mesh screen, and stirring the same during the hydrogen fluoride treating steps.

11. In a continuous process of producing beryllium fluoride from siliceous beryllium ore, the steps comprising charging the ore into a conversion chamber and discharging beryllium fluoride material therefrom, passing hydrogen fluoride through the ore, maintaining the temperature of the charge in one part of the chamber at about 450 to 500° C., and maintaining the temperature of the material in another part of the chamber between about 600 and 700° C., whereby the silica of the charge is substantially eliminated in the first mentioned part of the chamber and the beryllia of the material is converted to beryllium fluoride in the other part of the chamber.

12. In the process of claim 11, the additional improvement of treating the ore with hydrogen fluoride in the presence of carbon in a form capable of reducing water at the temperatures employed.

13. In the process of claim 11, the additional improvement of treating the ore with hydrogen fluoride in the presence of carbon.

14. In the process of claim 11, the additional improvement of treating the ore with hydrogen fluoride in the presence of methane.

WARREN S. PETERSON.
CHARLES B. WILLMORE.

REFERENCES CITED

The following references are of record in the file of this patent:

UNITED STATES PATENTS

| Number | Name | Date |
| --- | --- | --- |
| 1,851,476 | Zimmerman | Mar. 29, 1932 |